United States Patent
Lee et al.

(10) Patent No.: US 7,346,363 B2
(45) Date of Patent: Mar. 18, 2008

(54) APPARATUS AND METHOD FOR SHARING RADIO PROTOCOL ENTITIES IN WIRELESS COMMUNICATION SYSTEM

(75) Inventors: Young Dae Lee, HaNam-Shi (KR); Seung June Yi, Seoul (KR); Sung Duck Chun, Anyang (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/919,970

(22) Filed: Aug. 16, 2004

(65) Prior Publication Data

US 2005/0043050 A1 Feb. 24, 2005

(30) Foreign Application Priority Data

Aug. 19, 2003 (KR) .................. 10-2003-0057387

(51) Int. Cl.
*H04Q 7/20* (2006.01)
(52) U.S. Cl. .................. 455/515; 455/560; 455/466; 370/338
(58) Field of Classification Search ........... 455/560, 455/466, 132, 515; 370/338, 335
See application file for complete search history.

(56) References Cited

U.S. PATENT DOCUMENTS

| 2003/0174678 | * | 9/2003 | Chang et al. | 370/335 |
| 2004/0029616 | * | 2/2004 | Kim et al. | 455/560 |
| 2004/0146033 | * | 7/2004 | Soderstrom et al. | 370/338 |
| 2004/0147236 | * | 7/2004 | Parkvall et al. | 455/132 |
| 2004/0266461 | * | 12/2004 | Beckmann et al. | 455/466 |

FOREIGN PATENT DOCUMENTS

EP 1 387 591 A1 2/2004

OTHER PUBLICATIONS

3GPP: "3rd Generation Partnership Project; Technical Specification Group Radio Access Network; Introduction of the Multimedia Broadcast Multicast Service (MBMS) in the Radio Access Network (Stage 2); (Release 6)" 3GPP TS 25.346 V2.0.0, [online] Jun. 2003, p. 7, paragraph 5.1.1—p. 19, paragraph 9.1.

\* cited by examiner

*Primary Examiner*—Joseph Feild
*Assistant Examiner*—Phuoc Doan
(74) *Attorney, Agent, or Firm*—Lee, Hong, Degerman, Kang & Schmadeka

(57) ABSTRACT

A radio protocol entity sharing apparatus and method are provided. Different cells share a second-layer protocol entity to use the same channel parameter values and the same protocol parameter values, thereby reducing a delay resulting from reestablishing a radio bearer in the event of a handover, minimizing data loss during handover, conserving network resources, and enhancing reception performance via soft combining. The method includes steps of receiving, in a mobile station, a first parameter value and a first parameter value indicator; establishing a channel using the first parameter value and the first parameter value indicator; receiving, in the mobile station, a second parameter value indicator; and maintaining the established channel if the first parameter value indicator is identical to the second parameter value indicator.

17 Claims, 7 Drawing Sheets

APPARATUS AND METHOD FOR SHARING RADIO PROTOCOL ENTITIES IN WIRELESS COMMUNICATION SYSTEM

CROSS-REFERENCE TO RELATED APPLICATIONS

This application claims the benefit of Korean Application No. 10-2003-0057387 filed on Aug. 19, 2003, which is hereby incorporated by reference.

BACKGROUND OF THE INVENTION

1. Field of the Invention

The present invention relates to providing a user service in a wireless communication system, such as a universal mobile telecommunications system (UMTS), and more particularly, to providing a multimedia broadcast/multicast service (MBMS) in a plurality of cells by using one or more shared radio protocol entities.

2. Discussion of the Related Art

Referring to FIG. 1, illustrating a general UMTS network structure, the UMTS comprises a user equipment (UE) which is also referred to as a mobile terminal, a UMTS terrestrial radio access network (UTRAN), and a core network. The UTRAN comprises a plurality of radio network subsystems, each of which comprises one radio network controller (RNC) and at least one base station (or Node B) managed by the RNC. The Node B managed by the RNC receives uplink information transmitted from a physical layer of the UE and transmits downlink data to the UE, thereby serving as an access point for connecting the UE to the UTRAN. The RNC is responsible for allocation and management of radio resources and serves as an access point in connecting the Node B to the core network. An RNC managing radio resource for a specific UE is a serving RNC, and an RNC managing common resources for a plurality of UEs within one cell is a controlling RNC. A drift RNC is any RNC, other than the serving RNC, through which a UE communicates.

An interface between RNC and core network is the Iu interface, an interface between serving RNC and drift RNC is the Iur interface, and an interface between RNC and Node B is the Iub interface. Each interface provides control information or data transfer service via a transport bearer. For instance, a bearer provided in the Iub interface is an Iub transport bearer, and the Iub transport bearer provides control information and data transmission between RNC and Node B.

FIG. 2 illustrates the architecture of a radio interface protocol between one UE and the UTRAN. Referring to FIG. 2, a radio interface protocol vertically comprises a physical layer (Layer 1 or L1), a data link layer (Layer 2 or L2), and a network layer (Layer 3 or L3). The radio interface protocol horizontally comprises a user plane for providing data information and a control plane for providing control signals (signaling). The user plane carries user traffic for voice or Internet protocol (IP) packet transfer and the like. The control plane carries control information for the maintenance and management of interface or call within the network and the like. The protocol layers include first (L1), second (L2), and third (L3) layers, which are the three lower layers of the open system interconnection reference model.

The L1 layer provides an information transfer service to a higher layer using various radio transport technologies. The L1 layer is linked to a medium access control (MAC) layer of the higher layer via transport channels. Data is delivered between the MAC and physical layers via the transport channels.

The MAC layer provides reallocation services of MAC parameters for allocation and reallocation of radio resources. The MAC layer is connected to a radio link control (RLC) layer as a higher layer via logical channels. The logical channels are categorized, according to data type, as control channels or traffic channels. Generally, the control channels are used in transferring information of the control plane, and the traffic channels are used in transferring information of the user plane. The MAC layer comprises a MAC-b sublayer, a MAC-d sublayer, and a MAC-c/sh sublayer, categorized according to the type of transport channels being managed. The MAC-b sublayer manages a broadcast channel as a transport channel responsible for broadcasting system information. The MAC-c/sh layer manages common transport channels, which are shared with other UEs, such the forward access channel (FACH) and downlink shared channel (DSCH). The MAC-c/sh sublayer is located in the controlling RNC within UTRAN and manages the channels common with all the UEs within the cell. Hence, one MAC-c/sh sublayer exists in each cell, and one UE includes one MAC-c/sh sublayer. The MAC-d sublayer manages dedicated channel (DCH) as a dedicated transport channel to a specific UE. Hence, the MAC-d layer of UTRAN is located in the serving RNC, and each UE also has one MAC-d sublayer.

To provide an MBMS service in accordance with the method of the present invention, an MBMS function is appended to the functions of the MAC-c/sh layer, thereby creating a MAC-c/sh/m layer. There is one MAC-c/sh/m layer per cell in the UTRAN and one MAC-c/sh/m layer per UE.

The radio link control (RLC) layer supports reliable data transfer and is operative in performing segmentation and concatenation of an RLC service data unit, which is delivered from a higher layer and adjusted in size to fit processing capacity in the RLC layer. A header is then appended to the adjusted RLC service data unit to be delivered to the MAC layer in the form of a protocol data unit. The RLC buffer exists in the RLC layer to store the RLC service data units or RLC protocol data units delivered from the higher layer.

A broadcast/multicast control (BMC) layer is located above the RLC layer, and schedules a cell broadcast message delivered from the core network, and is operative in broadcasting to UEs in a specific cell or cells.

A packet data convergence protocol (PDCP) layer is located above the RLC layer and is operative in efficiently transferring data, which is transferred via such a network protocol as IPv4 and IPv6, over a radio interface having a relatively small bandwidth. Thus, through a process known as header compression, the PDCP layer eliminates unnecessary control information utilized in a wire network, such that only information essential to the header is included for transfer, thereby enhancing the transmission efficiency of a radio section.

A radio resource control (RRC) layer, which is part of the L3 layer, is defined on the control plane only. Concerning the establishment, reconfiguration, and release of radio bearers, the RRC layer controls the transport and physical channels. A radio bearer is a service, provided by the second layer, for the data transfer between UE and UTRAN securing a certain QoS (quality of service). Radio bearer establishment, in general, defines the regulating characteristics of the protocol layers and channels needed to provide a specific service and respectively configures the respective parameters and operation methods. A UE is said to be in an RRC-connected mode when the RRC layers of the UE and the UTRAN are in communication with each other, to enable a communication of RRC messages, and is in the RRC-idle mode when there is no such communication.

An MBMS service provides a streaming or background service to a plurality of UEs using a downlink only MBMS radio bearer. In the UTRAN or a network, an MBMS service may utilize point-to-multipoint or point-to-point radio bearer services. The point-to-multipoint service generally represents transmitting data from a network to a plurality of UEs. The point-to-point service generally represents transmitting data from a network to a designated UE.

In the MBMS broadcast mode, multimedia data is transmitted to all UEs within a broadcast area, i.e., the domain where the broadcast service is available. In the MBMS multicast mode, multimedia data for a specific UE group is transmitted within a multicast area, i.e., the domain where the multicast service is available. MBMS service requires the support of two logical channels: an MBMS control channel (MCCH), which is a point-to-multi point downlink channel for transmitting MBMS control information to UEs, and an MBMS traffic channel (MTCH), which is a point-to-multi point downlink channel for transmitting MBMS data to UEs. One MCCH channel exists in each cell, and one MTCH channel exists for each specific MBMS within a specific cell. Both logical channels are mapped to a transport channel (FACH) and a secondary common control physical channel (S-CCPCH).

FIG. 3 illustrates MTCH protocol architecture according to a related art, in which an example RNC configuration has two Node Bs, with one managing three cells and another managing one cell. Each cell has separately configured radio bearer parameters for every PHY, RLC, and PDCP entity per MTCH channel per MBMS service in the UTRAN side. The same protocol entities are similarly established in the UE side (not shown).

In the related art, however, the network independently configures (and reconfigures) separate protocol entities for each cell. Hence, despite providing the same service, the protocol entities may be differently configured, whereby entity-associated parameter values are independently and separately set by the different protocol entities existing in the different cells, and the protocol entities providing the same service are independently managed and controlled. As a result, the UE needs to reconfigure new protocol parameters whenever it moves to another cell. Thus, there is an undesirable delay before a new radio bearer is established, during which time the UE has no radio bearer and thus receives no MBMS data. Therefore, data loss occurs when moving to a new cell. Moreover, the UE is unable to achieve soft combining gain, in which values from various cells are combined during a soft handover.

SUMMARY OF THE INVENTION

Accordingly, the present invention is directed to a radio protocol entity sharing apparatus and method that substantially obviates one or more problems due to limitations and disadvantages of the related art.

An object of the present invention is to provide a radio protocol entity sharing method for MBMS services. At least one protocol entity shared by a plurality of cells and common associated parameter values are used for a specific MBMS service and establishment of a bearer is facilitated when a UE moves to another cell. Data loss occurring during handover is minimized, soft combining gain can be achieved between cells and a waste of network resources is prevented using a single protocol entity and single associated parameter values for a specific MBMS service.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method is provided for a point-to-multipoint service in a cellular system. The method includes establishing a radio protocol entity in a radio access network for the point-to-multipoint service for a group of cells, each cell capable of servicing at least one mobile terminal with uplink and downlink communication capabilities, and providing data for the point-to-multipoint service through the same radio protocol entity to the group of cells. Preferably, the group of cells belongs to a radio network system and the radio access network includes at least one radio network system. The radio protocol entity includes at least a medium access control entity (MAC), a radio link control entity (RLC) or packet data convergence protocol entity (PDCP).

According to one aspect of the invention, the method further includes transmitting to the group of cells a parameter indicator and a radio protocol parameter associated with the parameter indicator necessary for at least one mobile terminal in one of the group of cells to receive the point-to-multipoint service, wherein the parameter indicator is identical for the group of cells.

According to another aspect of the invention, the radio protocol entity provides the point-to-multipoint service through a common traffic channel. Also, the parameter indicator is transmitted through a common control channel, and the common control channel is a broadcast control channel (BCCH). Preferably, the common control channel is a multimedia broadcast multicast service control channel (MCCH).

According to another embodiment of the invention, a method is provided for receiving a point-to-multipoint service. The method includes receiving a first parameter indicator and a first radio protocol parameter associated with the first parameter indicator, establishing a radio protocol entity for receiving the point-to-multipoint service in a mobile terminal according to the received first radio protocol parameter, receiving a second parameter indicator necessary to receive the point-to-multipoint service, continuing to receive the point-to-multipoint service without receiving a second radio protocol parameter associated with the second parameter indicator if the first and second parameter indicators are identical, receiving the second radio protocol parameter if the first and second parameter indicators are not identical, and reestablishing the radio protocol entity according to the received second radio protocol parameter for receiving the point-to-multipoint service.

According to one aspect of the invention, the first parameter indicator and the second parameter indicator are received in the same cell. Alternatively, the first parameter indicator is received in a first cell and the second parameter indicator is received in a second cell.

According to another aspect of the invention, each one of the first and second parameter indicators identifies a group of cells sharing the radio protocol entity. Preferably, the radio protocol entity includes at least a medium access control module (MAC), a radio link control module (RLC) or a packet data convergence protocol entity (PDCP).

According to another embodiment of the invention, a wireless communication system for providing a point-to-multipoint service in a cellular system includes a radio access network, such as RAN or UTRAN, for establishing a radio protocol entity for the point-to-multipoint service for a group of cells. Each cell is capable of servicing at least one mobile terminal with uplink and downlink communication capabilities, with the radio access network providing data for the point-to-multipoint service through the same radio protocol entity to the group of cells. Preferably, the radio protocol entity includes at least a medium access control entity (MAC), a radio link control entity (RLC) or a packet data convergence protocol entity (PDCP). The radio protocol entity transmits to the group of cells a parameter indicator and a radio protocol parameter associated with the parameter indicator necessary for at least one mobile terminal in one of the group of cells to receive the point-to-multipoint service. The parameter indicator is identical for the group of cells.

According to another embodiment of the invention, a mobile terminal for receiving a point-to-multipoint service includes a means for receiving a first parameter indicator and a first radio protocol parameter associated with the first parameter indicator, a means for establishing a radio protocol entity for receiving the point-to-multipoint service in a mobile terminal according to the received first radio protocol parameter, a means for receiving a second parameter indicator necessary to receive the point-to-multipoint service and a means for continuing to receive the point-to-multipoint service without receiving a second radio protocol parameter associated with the second parameter indicator if the first and second parameter indicators are identical. The mobile terminal further includes a means for receiving the second radio protocol parameter if the first and second parameter indicators are not identical and a means for reestablishing the radio protocol entity according to the received second radio protocol parameter for receiving the point-to-multipoint service.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

At least one protocol entity for transferring data of a specific MBMS service in a specific RNC is shared by a plurality of cells or Node Bs managed by the specific RNC. The at least one protocol entity is preferably radio protocol entity of a second layer and includes PDCP, RLC, and MAC sublayers. Preferably, each cell includes separate physical layers for the specific MBMS service, and for the physical layers to operate identically, the RNC preferably delivers the same parameter values to the physical layers via the Iub interface. Furthermore, after having received the specific MBMS service data from the core network, the RNC preferably delivers the MBMS data to the at least one protocol entity. Preferably, the at least one protocol entity delivers the received MBMS data to respective lower layer protocol entities, and if the lower layer is a physical layer (L1), the RNC preferably delivers the MBMS data via the Iub interface to the respective physical layers in each cell.

Figure 1:
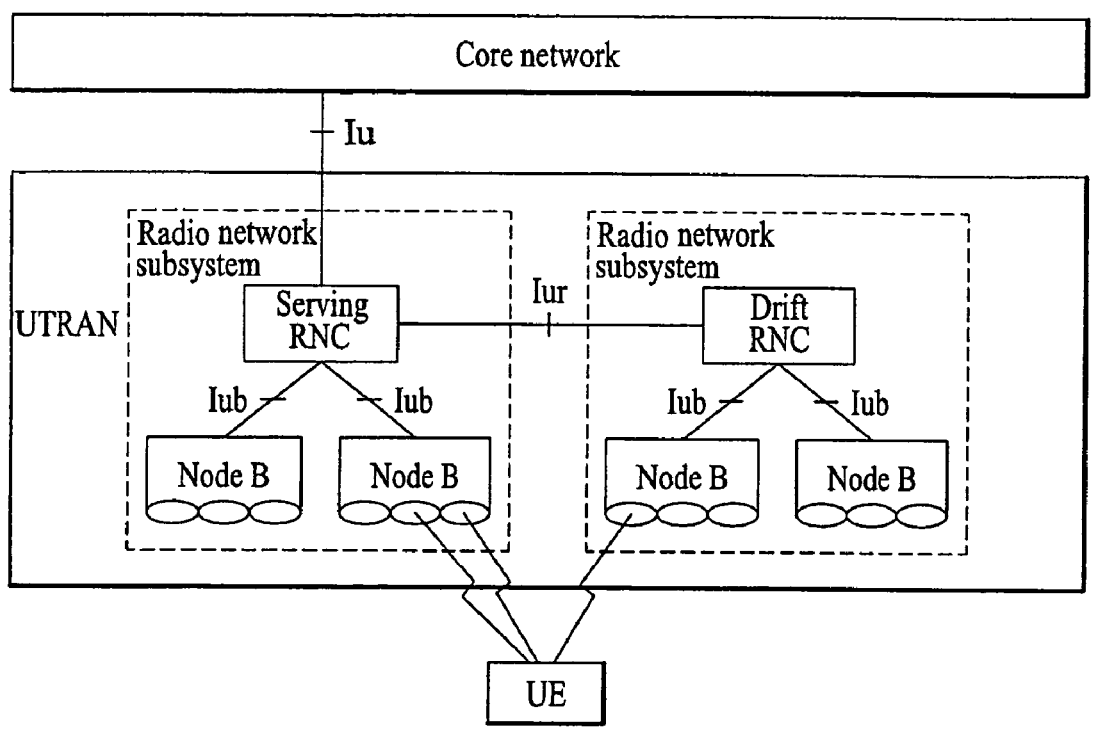
FIG. 1 is a structural diagram of a wireless communication network.
Figure 2:
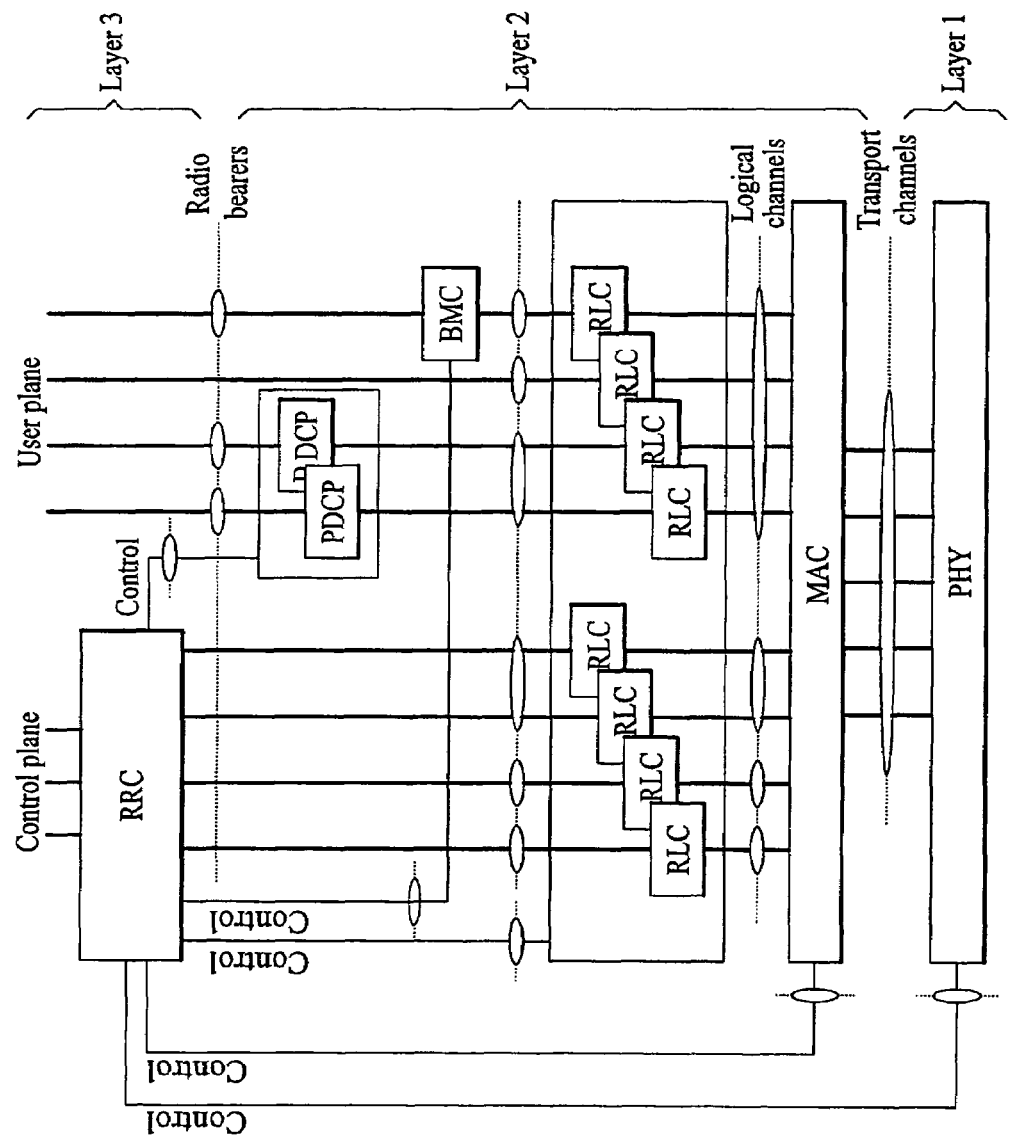
FIG. 2 is a diagram of radio interface protocol architecture between the UE and UTRAN of FIG. 1.
Figure 3:
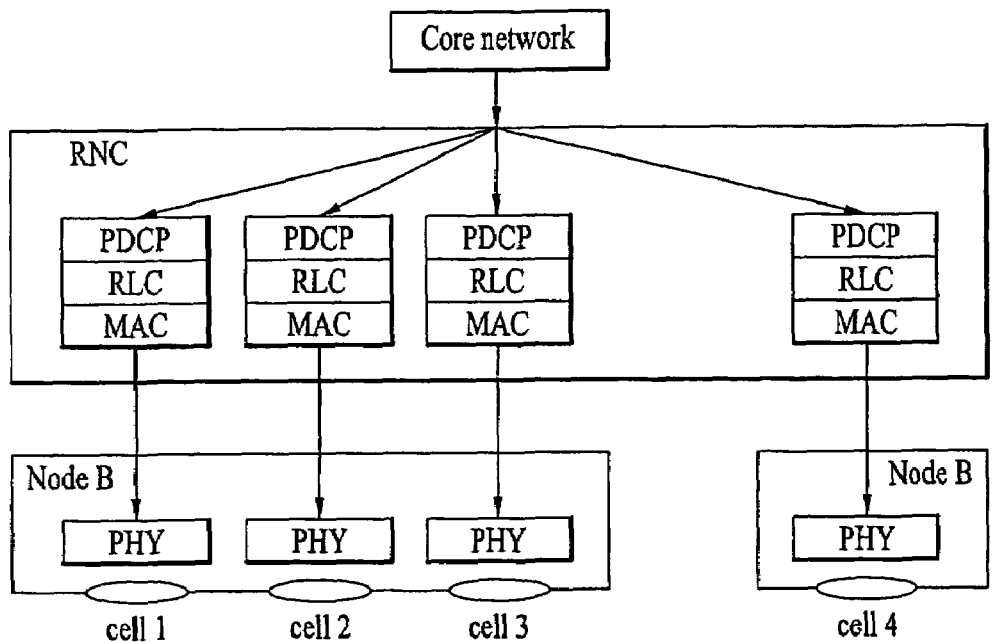
FIG. 3 is a block diagram of a protocol entity of the UTRAN, providing a specific MBMS service according to a related art.
Figure 4A:
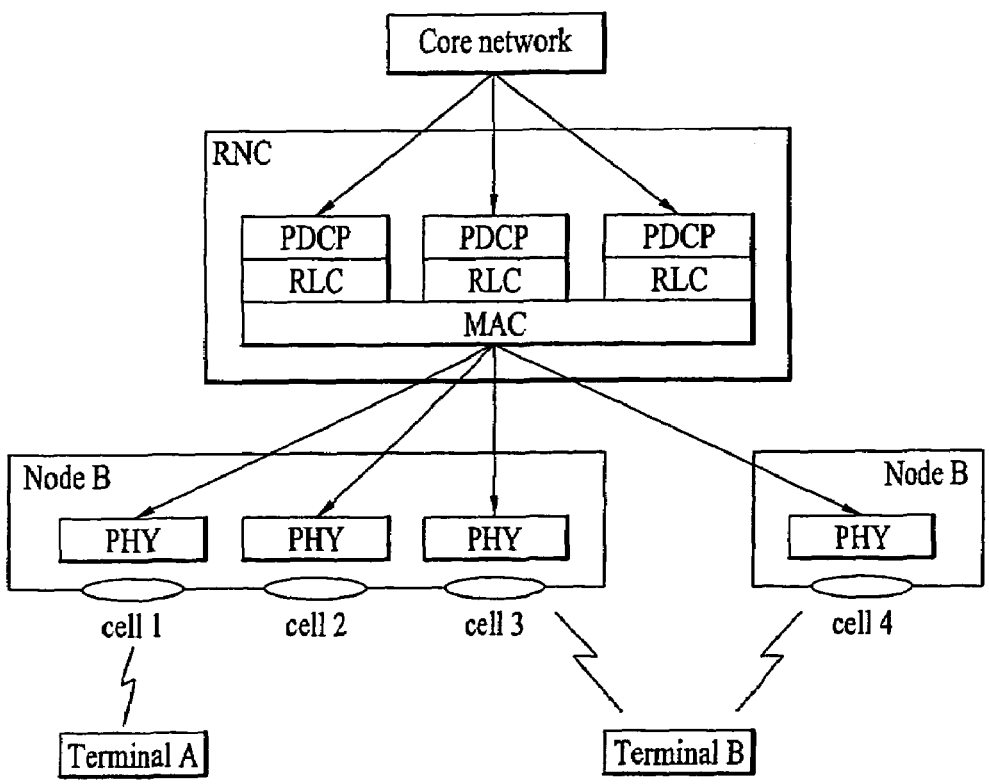
FIG. 4A is a block diagram of protocol entities of the UTRAN, providing a specific MBMS service by sharing layer 2 protocol entity according to another embodiment of the present invention.
Figure 4B:
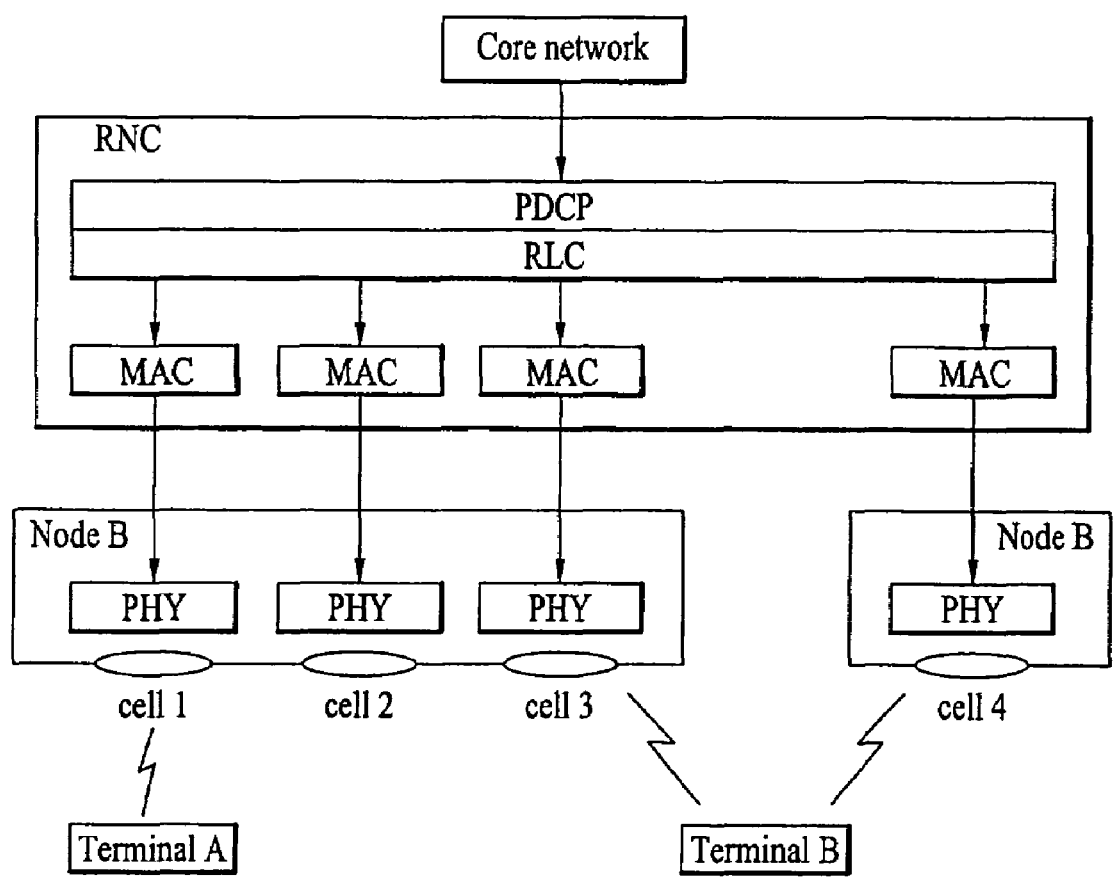
FIG. 4B is a block diagram of protocol entities of the UTRAN, providing a specific MBMS service by sharing layer 2 protocol entity according to alternative embodiment of the present invention.

FIGS. 4A and 4B illustrate protocol entities of the UTRAN, providing a specific MBMS service by sharing at least one of layer 2 protocol entities according to one embodiment of the present invention. In this example, an MTCH channel is being used as a logical channel for the RNC to provide three different MBMS services. In other words, the data is transmitted via three channels.

As shown in the RNC of FIG. 4A, second-layer protocol entities, which include the PDCP, RLC, and MAC sublayers, are configured to provide a specific MBMS service to a plurality of cells managed by the RNC. Referring to FIG. 4A, in the UTRAN side, the PDCP and RLC entities are separately provided for each service, where a plurality of cells (or Node Bs) each share the use of one PDCP entity and one RLC entity. Hence, in this case, the three different PDCP entities and three different RLC entities provide three different MBMS services, respectively, and are shared by the lower physical layers. And it is also possible only PDCP entity is shared by a plurality of cells for a specific MBMS service. FIG. 4B illustrates a network configuration in which both PDCP and RLC protocol entities are shared to provide a specific MBMS service to mobile terminals. Preferably, one PDCP entity and one RLC entity exist for one specific MBMS per radio access network (RAN). Alternatively, in lieu of sharing both PDCP and RLC, either PDCP or RLC may only need to be shared for the specific MBMS service.

One MAC entity in the UTRAN side is shared by the various MBMS services to also be used by a plurality of cells (Node Bs). Preferably, there is one MAC entity—more specifically, one MAC-c/sh/m sublayer—per RNC. The one MAC entity provides the three different MBMS services and is shared by the lower physical layers.

Two UEs, shown in FIGS. 4A and 4B as terminal A and terminal B, each receiving a specific MBMS service from at least two different cells or Node Bs, share one of the layer 2 radio protocol entity (e.g., the MAC sublayer in FIG. 4A, and the PDCP and the RLC sublayers in FIG. 4B) and the same associated parameter value for the specific MBMS service. In other words, despite being located in different cells, UEs receiving the same MBMS service share the same protocol entity and the same associated parameter value.

A plurality of cells share a protocol entity for the data transfer of a specific MBMS service. Hence, a logical channel provided by the protocol entity is also shared by the plurality of cells. Moreover, the cells share parameter values of logical, transport, and physical channels set up for the data transfer of the MBMS service. That is, the plurality of cells have the same parameter values of the logical, transport and physical channels and share the protocol parameter values of the protocol entity as well. Thus, the cells all possess the same channel parameter values and the same protocol parameter values. Furthermore, since the cells involved share the same protocol entity and protocol parameter values, the terminal B can, obtaining soft combining gain, simultaneously receive a specific MBMS service from two or more different cells.

Figure 5:
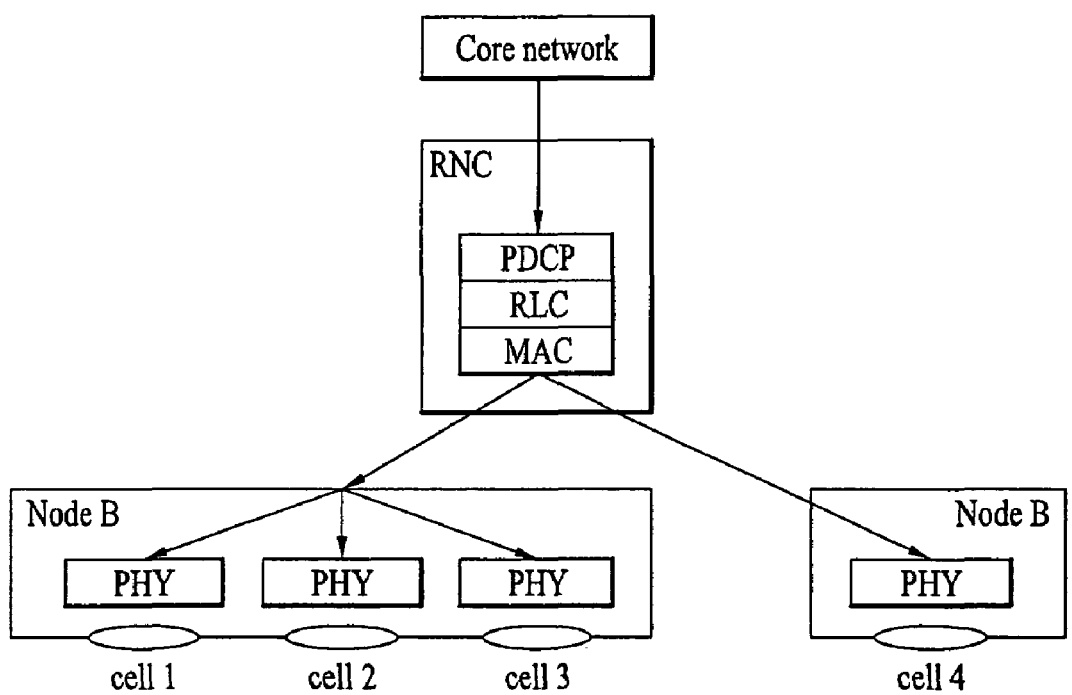
FIG. 5 is a block diagram of a protocol entity of the UTRAN, providing a specific MBMS service by sharing the Iub transport bearer according to the present invention.

FIG. 5 illustrates the protocol entity of a UTRAN providing a specific MBMS service when an Iub transport bearer is shared according to the present invention.

Referring to FIG. 5, in which a plurality of cells of one Node B commonly use one Iub transport bearer, one protocol entity is shared and one Iub data frame is transmitted once to various cells during one transmission time interval (TTI). The various cells share one MAC protocol data unit included in the Iub data frame. Node B receives the data frame via one shared Iub transport bearer and copies the MAC protocol data unit included in the received data frame, to deliver the data frame to a plurality of cells governed by the Node B.

According to the preferred embodiment of the present invention, a UE intending to receive a specific MBMS service sets up, for example, a channel and protocol entity for receiving the data of the specific MBMS service using the channel and protocol parameter values shared by the plurality of cells. These parameter values are referred to herein as common parameter values, or CPV information. The channel parameter values include parameter values of the logical channel MTCH, transport channel FACH, physical channel S-CCPCH used in transferring the data of the specific MBMS service. The protocol parameter values include parameter values of the PDCP, RLC, MAC, and physical layers used in transferring the data of the specific MBMS service. The UE uses the CPV information to set up channels and protocol entities for receiving the MBMS data. A UE moving to any one of a plurality of cells sharing the CPV information can, without reconfiguration of the logical and transport channels and the protocol entity, quickly receive the data in the new cell.

The UTRAN transmits to UEs, that are to receive a specific MBMS service, the above CPV information and a CPV identifier for identifying the CPV information per cell. Preferably, the CPV identifier uniquely identifies MBMS cell groups. As cells having the same CPV identifier use the same CPV information, if the CPV identifier of a new cell is identical to that of a previous cell, the UE having moved to the new cell can, using the CPV information of the previous cell, set up the channels and protocol entity for the new cell. Moreover, as cells having the same CPV identifier use the same CPV information, the UE can achieve soft combining gain when receiving MBMS data during handover.

Figure 6:
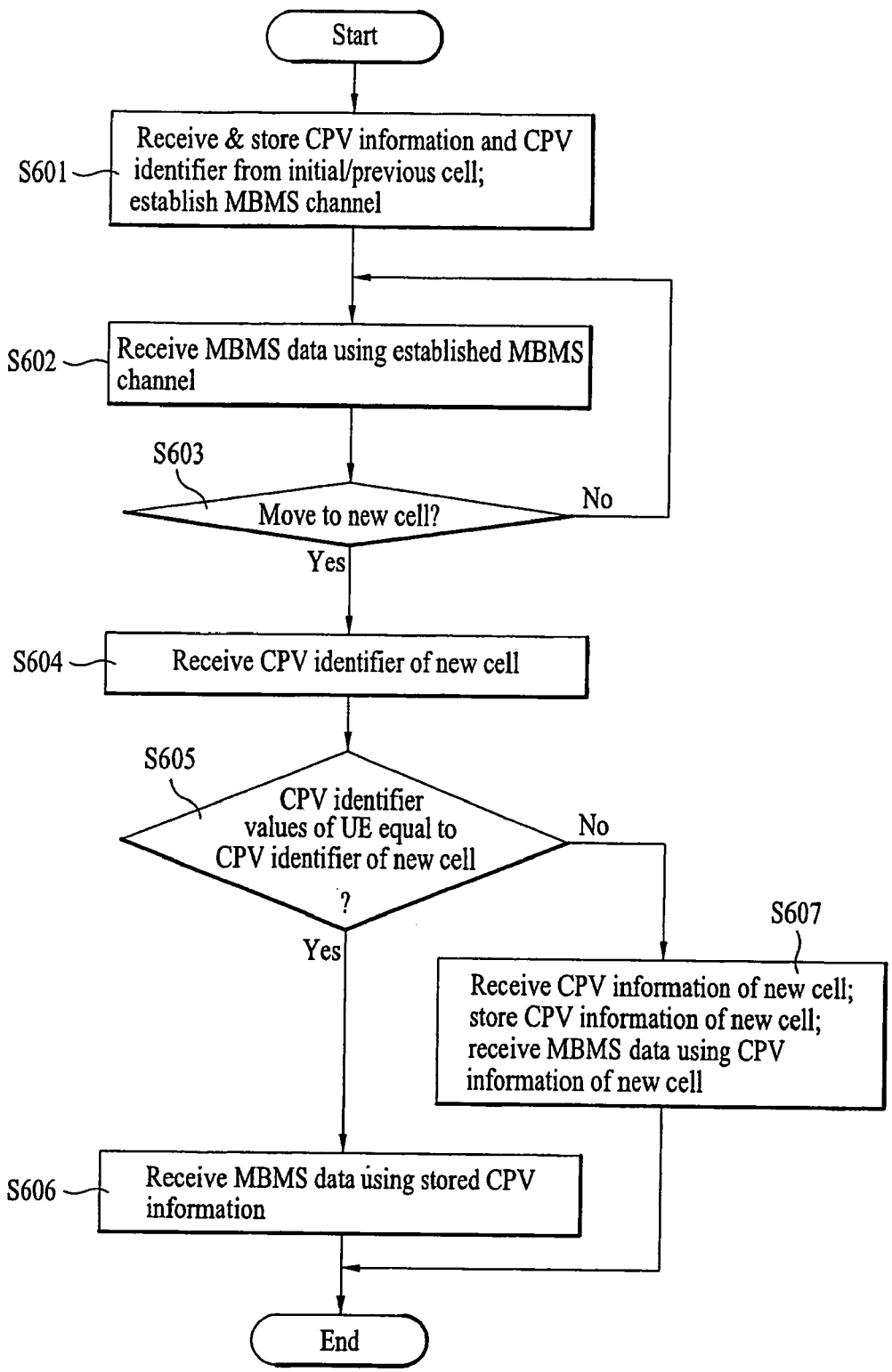
FIG. 6 is a flowchart for receiving a specific MBMS service in a UE (mobile terminal) according to a preferred embodiment of the present invention.

FIG. 6 illustrates a process of receiving a specific MBMS service in a UE adopting the method of the present invention. The UE operates using the CPV information and CPV identifier.

In step S601, a UE receives from an initial cell CPV information and a CPV identifier, stores the same, and establishes an MBMS channel for transferring data of a specific MBMS service using that information, and in step S602, the UE receives the MBMS data via the established MBMS channel while located in the initial (or previous) cell, that is, until moving to a new cell as determined according to step S603. In step S604, after the UE has moved to a new cell, the UE receives the CPV identifier transmitted from the new cell and compares the received value to the stored value, i.e., the CPV identifier of the previous cell, in step S605.

If the value of newly received CPV identifier (new cell) is the same as that of the stored CPV identifier (previous cell), the UE receives the MBMS data using the stored CPV information in step S606. Alternatively, the UE receives CPV information of the new cell and stores the new CPV information in place of that of the previous cell for use in receiving the MBMS data in the new cell via the MBMS channel using the newly stored CPV information in step S607. Once enabled to receive MBMS channels of the previous and new cells simultaneously, the UE performs soft combining on the MBMS channels from the two cells in a manner similar to that of a soft handover.

The method of the present invention can be implemented by a computer-readable program stored in a record media.

Accordingly, the present invention enables different cells to share a second-layer protocol entity to use the same channel parameter values and the same protocol parameter values, thereby reducing a delay resulting from reestablishing a radio bearer in the event of a handover, minimizing data loss during handover, conserving network resources, and enhancing reception performance via soft combining.

Figure 7:
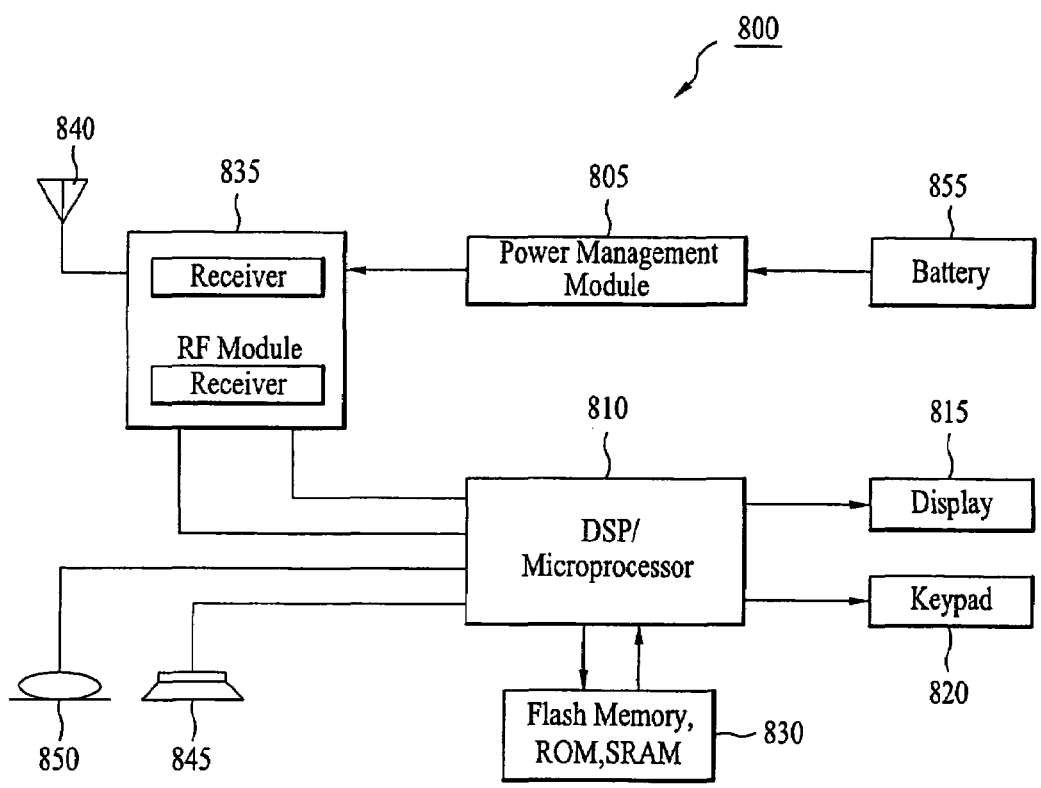
FIG. 7 illustrates a mobile communication device for receiving a service from a network according to one embodiment of the present invention.

Referring to FIG. 7, a block diagram of a mobile communication device 800 of the present invention is illustrated, for example a mobile phone for performing the methods of the present invention. The mobile communication device 800 includes a processing unit 810 such as a microprocessor or digital signal processor, an RF module 835, a power management module 805, an antenna 840, a battery 855, a display 815, a keypad 820, a storage unit 830 such as flash memory, ROM or SRAM, a speaker 845 and a microphone 850.

A user enters instructional information, such as a telephone number, for example, by pushing the buttons of the keypad 820 or by voice activation using the microphone 850. The processing unit 810 receives and processes the instructional information to perform the appropriate function, such as to dial the telephone number. Operational data may be retrieved from the storage unit 830 to perform the function. Furthermore, the processing unit 810 may display the instructional and operational information on the display 815 for the user's reference and convenience.

The processing unit 810 issues instructional information to the RF section 835, to initiate communication, for example, by transmitting radio signals comprising voice communication data. The RF module 835 includes a receiver and a transmitter to receive and transmit radio signals. The antenna 840 facilitates the transmission and reception of radio signals. Upon receiving radio signals, the RF module 835 may forward and convert the signals to baseband frequency for processing by the processing unit 810. The processed signals may be transformed into audible or readable information output, for example, via the speaker 845.

It will be apparent to one skilled in the art that the mobile communication device 800 may be readily implemented using, for example, the processing unit 810 or other data or digital processing device, either alone or in combination with external support logic.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of providing a point-to-multipoint service in a cellular system, the method comprising:

Establishing at least one shared radio protocol entity in a radio access network for the point-to-multipoint service for a group of cells belonging to a radio network subsystem (RNS);

providing data for the point-to-multipoint service through the at least one shared radio protocol entity to the group of cells; and transmitting an identifier identifying the group of cells and a parameter associated with the identifier necessary for at least one mobile terminal in one of the group of cells to receive the point-to-multipoint service, wherein the at least one shared radio protocol entity comprises at least one of a medium access control (MAC) entity, a radio link control (RLC) entity and a packet data convergence protocol (PDCP) entity.

2. The method of claim 1, wherein the radio access network comprises at least one radio network system.

3. The method of claim 1, the radio protocol entity provides the point-to-multipoint service through a common traffic channel.

4. The method of claim 1, wherein the identifier and parameter are transmitted through a common control channel.

5. The method of claim 4, wherein the common control channel is a broadcast control channel (BCCH).

6. The method of claim 4, wherein the common control channel is a multimedia broadcast multicast service control channel (MCCH).

7. A wireless communication system for providing a point-to-multipoint service in a cellular system, the wireless communication system comprising:

a radio access network establishing at least one shared radio protocol entity for the point-to-multipoint service for a group of cells belonging to a radio network subsystem (RNS), providing data for the point-to-multipoint service through the at least one shared radio protocol entity to the group of cells, and transmitting an identifier identifying the group of cells and a parameter associated with the identifier necessary for at least one mobile terminal in one of the group of cells to receive the point-to-multipoint service, wherein the at least one shared radio protocol entity comprises at least one of a medium access control (MAC) entity, a radio link control (RLC) entity and a packet data convergence protocol (PDCP) entity.

8. The wireless communication system of claim 7, wherein the radio access network comprises at least one radio network system.

9. The wireless communication system of claim 7, wherein the at least one shared radio protocol entity comprises at least one of an RLC entity and a PDCP entity.

10. The wireless communication system of claim 7, the radio protocol entity provides the point-to-multipoint service through a common traffic channel.

11. The wireless communication system of claim 7, wherein the identifier and parameter are transmitted through a common control channel.

12. The wireless communication system of claim 11, wherein the common control channel is a broadcast control channel (BCCH).

13. The wireless communication system of claim 11, wherein the common control channel is a multimedia broadcast multicast service control channel (MCCH).

14. A method of receiving a point-to-multipoint service in a mobile terminal moving between two cells, comprising:

receiving from a first cell the point-to-multipoint service using radio protocol entities established in the first cell;

receiving from a second cell an identifier identifying a cell group including the second cell and a parameter associated with the identifier necessary for at least one mobile terminal in a cell of the cell group to receive the point-to-multipoint service, the cell group belonging to a radio network subsystem (RNS); and receiving the point-to-multipoint service from the second cell using at least one common radio protocol entity established in the first cell, if the cell group identifier of the second cell is identical to a cell group identifier of the first cell, wherein the at least one shared radio protocol entity comprises at least one of a medium access control (MAC) entity, radio link control (RLC) entity, and racket data convergence protocol (PDCP) entity.

15. The method of claim 14, wherein the point-to-multipoint service is received through a common traffic channel.

16. The method of claim 14, wherein the cell group identifier and the parameter are received through a common control channel.

17. The method of claim 16, wherein the common control channel is a broadcast control channel (BCCH) or a multimedia broadcast multicast service control channel (MCCH).

\* \* \* \* \*